(12) United States Patent
Weichenberger et al.

(10) Patent No.: US 7,502,677 B2
(45) Date of Patent: Mar. 10, 2009

(54) METHOD, DEVICE AND CRASH SENSOR FOR ACTIVATING OCCUPANT PROTECTION SYSTEMS IN A MOTOR VEHICLE

(75) Inventors: Lothar Weichenberger, Klingsmoos (DE); Alfons Woehrl, Schrobenhausen (DE); Jan Urbahn, Ramsey, NJ (US); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/646,242

(22) Filed: Dec. 28, 2006

(65) Prior Publication Data

US 2007/0152433 A1 Jul. 5, 2007

Related U.S. Application Data

(63) Continuation of application No. PCT/EP2005/006832, filed on Jun. 24, 2005.

(30) Foreign Application Priority Data

Jun. 29, 2004 (DE) .................. 10 2004 031 557

(51) Int. Cl.
*E05F 15/00* (2006.01)
*B60R 21/01* (2006.01)

(52) U.S. Cl. ........................................ 701/45; 280/735

(58) Field of Classification Search .................. 701/29, 701/34, 45–47; 280/728.1, 734–735; 180/271; 340/901, 903, 425.5, 426

See application file for complete search history.

(56) References Cited

U.S. PATENT DOCUMENTS 5,484,166 A * 1/1996 Mazur et al. ................ 280/735
5,742,916 A * 4/1998 Bischoff et al. .............. 701/45

6,459,366 B1 * 10/2002 Foo et al. ................... 340/436

(Continued)

FOREIGN PATENT DOCUMENTS

DE 3729019 3/1989

(Continued)

OTHER PUBLICATIONS

German Search Report, Dec. 20, 2004.

(Continued)

*Primary Examiner*—Yonel Beaulieu
(74) *Attorney, Agent, or Firm*—Crowell & Moring LLP (57) ABSTRACT

Occupant protection systems in a motor vehicle are activated in the event of a crash that puts the occupants of the vehicle at risk. A processor-based trigger system evaluates signals of crash sensors and actuates the occupant protection systems. Signatures that are produced by impacts on the vehicle body by means of a crash sensor system are detected and preprocessed directly on site of the crash sensor mounting areas. The crash sensor system includes a plurality of similar multifunctional peripheral crash sensors located in various areas of the vehicle body. The preprocessed signatures or variables derived therefrom are evaluated by means of a crash algorithm associated with the trigger system, in terms of kind, intensity, direction and time of the crash signatures and/or occupant risk signatures. Crash-relevant occupant protection systems are triggered at respective times determined in terms of the achievable protective effect of the occupant protection system when occupant risk threshold values are exceeded.

17 Claims, 7 Drawing Sheets

U.S. PATENT DOCUMENTS 6,600,984 B1 * 7/2003 Holzner et al. ................ 701/45

FOREIGN PATENT DOCUMENTS

| | | |
|---|---|---|
| DE | 3736294 | 5/1989 |
| DE | 3811217 | 10/1989 |
| DE | 4322488 | 5/1994 |
| DE | 4425846 | 1/1996 |
| DE | 19609290 | 4/1997 |
| DE | 19745309 | 4/1999 |
| DE | 19855452 | 6/2000 |
| DE | 19955559 | 6/2000 |
| DE | 19926845 | 10/2000 |
| DE | 10012434 | 5/2001 |
| DE | 10034524 | 1/2002 |
| DE | 10044918 | 3/2002 |
| DE | 10050956 | 5/2002 |
| DE | 10058986 | 6/2002 |
| DE | 10062427 | 7/2002 |
| DE | 10245780 | 4/2004 |
| EP | 0305654 | 3/1989 |
| WO | WO 95/11455 | 4/1995 |

OTHER PUBLICATIONS

International Search Report, Sep. 16, 2005.

* cited by examiner

METHOD, DEVICE AND CRASH SENSOR FOR ACTIVATING OCCUPANT PROTECTION SYSTEMS IN A MOTOR VEHICLE

CROSS REFERENCE TO RELATED APPLICATIONS

This application is a continuation of PCT International Application No. PCT/EP2005/006832, filed Jun. 24, 2005, which claims priority under 35 U.S.C. § 119 to German Patent Application No. 10 2004 031 557.4, filed Jun. 29, 2004, the entire disclosures of which are herein expressly incorporated by reference.

BACKGROUND AND SUMMARY OF THE INVENTION

The present invention relates to a method of activating occupant protection systems in a motor vehicle relevant to the risk to the occupants in the event of a crash, by which, by means of a processor-based triggering system, signals of crash sensors are evaluated and the occupant protection systems are actuated.

The invention also relates to a device, a crash sensor for a device as well as a motor vehicle having a device for activating occupant protection systems relevant to the risk to the occupants in the event of a crash, in the case of which, by means of a processor-based triggering system, crash sensor signals can be evaluated and the occupant protection devices can be actuated.

For protecting the occupants from injury or death in the event of a crash, modern motor vehicles are equipped with occupant protection systems. Such a system usually consists of several occupant protection devices, such as frontal air bags, side air bags, head air bags, seat belt tighteners and a processor-based triggering system for activating the protection devices in the event of a crash. The occupant protection systems are predominantly designed for only one activation operation and, after their activation (seat belt tightening and locking, inflating of air bags), protect the occupants in the event of a crash from more serious injuries as a result of impacting on vehicle parts in the interior or by being thrown from the motor vehicle. Particularly, in the case of open vehicles or vehicles having light vehicle tops, integrated rollover bars may be added which are moved out in the event of a rollover in order to provide the occupants with a protective hollow space with respect to the vehicle body.

The occupant protection systems achieve the occupant's protection in the event of a crash by restraining the occupant against the buildup of a differential speed with respect to the motor vehicle starting at the point in time of their triggering, and by the damping of the resulting occupant impact from his resulting differential speed on the motor vehicle. The efficiency of the protection devices for the protection of occupants therefore depends considerably on their activation at the proper time. In particular, the protective effect of the air bags depends on the chronological position of the point in time of the activation in the course of the crash. The activation therefore has to take place precisely at the point in time in the course of the crash which permits the corresponding protection device to provide maximal protection to the occupant. An earlier as well as a later activation of the respective protection device results in a high loss of protective performance for the occupant, particularly by deviations from the safety-providing optimal braking of the occupant's body by an excessive differential speed with respect to the motor vehicle or with respect to the air bag and/or by a damping path which is too short.

Furthermore, an unnecessary triggering of protection devices during lighter crash events without risk to the occupants is to be avoided, because it may cause dangerous wrong reactions by frightened occupants, and results in high costs for restoring the now non-existing operational readiness of the once triggered protection device(s) for a future crash event. Finally, for reasons of safety (limitation of view, restriction of mobility, pyrocharge quantity), the duration of the protective effect should be limited to the required minimum. In this case, the operational safety of the respective occupant protection device should be guaranteed according to DIN (Standard) IEC 61508-SIL2/3.

The triggering system therefore has to recognize whether a crash event is occurring which represents a risk to the occupants and, as required, has to trigger the corresponding protection devices at the respective correct point in time. Subsequently, the protection devices have to automatically deactivate (unlocking of seat belts, evacuation of air bags).

The demands on the occupant protection devices are increasingly heightened by current development trends in the automobile industry and in the vehicle handling, such as crumple zones with smaller dimensions, high crash velocities and crash events over larger crash angle ranges, so that a continuous further development of the existing occupant protection devices is required.

Known occupant protection systems have a triggering system arranged at a central site in the motor vehicle, for example, at the so-called vehicle tunnel. For detecting the crash and for determining the activation points in time for the individual protection devices, they use an acceleration signal, which is detected in one or more coordinates by way of a central acceleration sensor, such as an inertia sensor, arranged in the triggering system. By means of an assigned analyzing unit, the triggering system interprets the sensor signal form which, in the event of a crash, is recognized as a crash signature, and, as required, initiates appropriate measures for activating the occupant protection devices.

With known occupant protection systems, the acceleration course resulting from the measured acceleration vector, depending on the crash type, for example, a frontal crash or lateral crash, has a considerable angle dependency. The thus obtained crash signature is therefore at best sufficient for the different crash events in the longitudinal direction of the vehicle (X-direction range); that is, in the case of a frontal or rear crash, for the purpose of a reliable crash determination but not for the different crash events in the transverse direction of the vehicle (Y-direction range); that is, in the case of a lateral crash because, the known triggering systems for the evaluation of the acceleration vector, with an increasing deviation of the crash direction from the X-direction and/or with an increasing crash velocity, require an excessively large crash time fraction for the sufficiently probably correct crash detection. In addition to the acceleration, vehicle body deformations, which are assigned to a so-called occupant protection signature, and the maximally possible braking distance of the occupant body (body braking distance), which is assigned to a so-called occupant risk signature, also have a considerable angle dependency depending on the crash type. In addition, the angle dependencies of the different signatures (acceleration signature, occupant protection signature, occupant risk signature) are not correlated in the same direction. The information content of an acceleration vector measured at the motor vehicle tunnel (or at a comparable site) is therefore critical to insufficient for a correct crash detection and a triggering of the occupant protection devices at the proper time, particularly in the case of a lateral impact.

Further occupant protection systems known, for example, from German Patent Document DE 44 25 846 A1 therefore, in addition to the acceleration vector detected in the triggering system itself, use additional acceleration vectors of measuring aids mounted, for example, in door pillars and transferred to the motor vehicle periphery.

Other occupant protection systems in motor vehicles known, for example, from German Patent Document DE 43 22 488 C2, from International Patent Document WO95/11455 A1 and from German Patent Document DE 100 62 427 A1, in addition to the acceleration signature detected in the triggering system itself, for the crash detection and the crash evaluation, and the acceleration signatures detected by the acceleration signature measuring aids, use, in addition or as an alternative, also pressure sensors in the door cavities, which supply pressure distribution signatures in order to feed more relevant signatures of lateral crash events to the triggering system.

Furthermore, occupant protection system are known, for example, from German Patent Documents DE 198 55 452 A1, DE 100 12 434 A1 and DE 100 34 524 A1, which use structure-borne sound sensors, such as piezoelectric sensors, which, in the event of a crash, sense high-frequency vehicle body vibrations which are used for an analysis of the thereby generated frequency spectrum signatures.

Although these known occupant protection systems improve the crash detection and crash evaluation by the triggering system in comparison to simple systems with only a central acceleration sensor, they are not yet optimized with respect to the thereby previously achieved crash sensitivity, crash selectivity, the expenditure of cost and construction and particularly with respect to a triggering at a proper time. Faults, which have occurred in practice in the case of occupation protection systems, such as a lack of triggering or a triggering which is too early or too late when there is a risk to the occupants, or an undesirable triggering when there is no risk or an uncritical risk to the occupants, are still becoming known. The known methods or devices detect by means of their sensors either in each case only one type of signal, or transmit these or, because of a plurality of different assemblies, require relatively high cost expenditures. Relatively frequently occurring interference signatures, to which the known occupant protection systems are relatively susceptible, make the situation more difficult. These are, for example, multiple excitations, such as worn-out wheel suspensions, worn-out control arms, water splashing against the vehicle body, unfastened transported material, or single excitations, such as door slamming, breaking shock of window glass, stone throw against the vehicle body and locking or unlocking shocks when operating the hand brake lever. These interference signatures are superimposed on the various signal signatures and may make the correct interpretation of a crash signature considerably more difficult and reduce its sensitivity. In particular, the triggering of the occupant protection devices in the event of lateral crashes has an excessively large time-related tolerance, that is, it has an excessively large deviation from the point in time optimal for the protective effect, which may considerably reduce the protective effect for the occupants in unfavorable cases.

Finally, from German Patent Document DE 102 45 780 A1, a device for detecting impacts is known which uses detectors distributed on the vehicle and mechanically operative according to the turning-fork principle, in connection with a central sensor.

With this known device, the (micro-mechanical) detectors are suitable only for the pure sound transmission without a processing possibility. An uninterrupted sound transmission to the central sensor always has to be ensured (even in the event of a crash). In addition, for a sufficiently crash-selective evaluation, additional sensors, particularly an impact sensor, which supply additional signals, can hardly be eliminated.

An aspect of the present invention is to improve the known methods for activating occupant protection devices in a motor vehicle in the event of a crash such that the different conceivable crashes and types of crashes can be reliably defined within the shortest period of time, that the corresponding occupant protection devices in the event of a crash are triggered with a lower time-related tolerance, so that a highest possible protective effect of the occupant protection devices is achieved, and that any malfunctioning is avoided.

Consistent with the present invention, a method of activating occupant protection systems in a motor vehicle relevant to a risk to occupants in the event of a crash is provided. The method comprises the acts of: detecting and preprocessing, directly at crash sensor mounting sites, signatures generated by effects on the vehicle body by means of a crash sensor system, the crash sensor system including a plurality of similar multifunctional peripheral crash sensors arranged at different sites of the vehicle body; evaluating the preprocessed signatures or variables derived therefrom by means of a crash algorithm assigned to a processor-based triggering system according to a type, an intensity, a direction and a time of crash, signatures and/or occupant risk signatures, and triggering crash-relevant occupant protection devices at respective triggering points in time defined according to the achievable occupant protection effect of the occupant protection devices when occupant risk threshold values are exceeded.

Motor vehicle bodies react to exterior effects, such as deformations, structural tensions or other stress with stress signals which propagate at velocities of up to 6,000 m/s over the vehicle body. In series of tests, it was found that the stress signals which are caused by occupant-endangering crash events—with a correspondingly high stress to the vehicle body—are manifested particularly in structure-borne ultrasound signals and lead there to characteristic crash signatures, that is, to characteristic signal images with respect to the amplitude, the time slope and the frequency spectrum. These are approximately in a frequency range from between $10^5$-$10^8$ Hz, which corresponds to a velocity of propagation of 6,000 m/s longitudinal waves with wavelengths in steel of 60-0.06 mm. By measuring this stress information by means of the peripheral crash sensors directly at the vehicle body, and by a rapid processing of the signals, preferably by way of a databus system, in the ideal case by an online process, significantly shorter triggering decisions can be implemented in comparison to conventional methods.

In the crash sensors, the detected signals are preprocessed by means of a corresponding electronic system and are fed into the databus system, so that the triggering system already obtains largely interference-free signals, whereby the crash detection is simplified and the crash selectivity or sensitivity is increased. The individual crash sensor detects physically diverse crash-relevant signatures, particularly a structure-borne ultrasound signature at the mounting site of the sensor, preprocesses it and holds it available by way of the databus for the triggering system.

By means of its crash algorithm, the triggering system evaluates the crash signatures taken over from the crash sensor system by way of the databus connections with respect to the type, the intensity and the time of the risk to the occupants or occupant seats, and, in the event of an exceeding of the risk threshold, triggers relevant occupant protection devices which can be activated. When determining the risk threshold, the occupant risk signature is used which essentially includes the maximally possible braking distance of the occupant's body. For defining the most suitable triggering point in time, data preferably filed in stored parameter fields and concerning the protective performance capability of the individual protection devices, which is a function of the triggering point in time, and their assigned protective stages are made available to the triggering system.

The triggering system, preferably arranged centrally in the motor vehicle, can exchange time-synchronous markers by way of an electronic triggering system or by way of a connection with a central control unit. As a result, the crash algorithm can particularly effectively process and evaluate the crash signatures. A crash event at the vehicle body can be located by means of the time-synchronous markers by determining the position of the source of sound generated by the crash by way of the transit time differences of the sound signals measured at the individual peripheral crash sensors. By the utilization of the high signal propagation velocities by way of the vehicle body, this can take place significantly faster than before because previously only sound propagations of a sound velocity in air (approximately 330 m/s) had been recorded. As a result of the data acquisition and preprocessing by means of the peripheral sensors directly at the vehicle body, or the mounting sites, the angle dependency of the signals is eliminated which had occurred during the previous use of central sensors and had resulted in delays there.

The signal signature is then used for the crash identification. From the propagating structure-borne sound information, the targeted evaluation of the ultrasound range is particularly effective. Different physical causes generate different signatures. For example, a burst-type signal in the range of $10^7$ Hz, which is characterized by a considerable peak which subsequently is rapidly damped, points to a grain boundary migration in the steel which, in turn, results in a plastic deformation on the vehicle body. In contrast, elastic deformations are more in the range of $10^6$ Hz. A structural crack is indicated more by a sinusoidal curve. In contrast, the constantly generated operating noises generate a continuous noise in the sound spectrum.

Various known methods may be used for the processing of the structure-borne ultrasound emission signals (typically in the range of from 0.5 to 5 MHz). Wavelet transformation methods are considered for a signal noise removal and compression. The recognition and distinguishing of artifacts (non-crash-relevant signals) can take place by means of so-called evolutionary algorithms and by means of fuzzy logic systems. For the detection of the crash point in time, so-called pimple algorithms can be used.

Particularly in comparison to previous methods, the fast and reliable evaluation of the structure-borne crash signatures, a side air bag triggering is permitted in the early course of the crash, whereby an only minimal reduction of the body braking distance and of the body braking time is ensured. The selection quality in the event of frontal/rear crashes as well as in the event of lateral/frontal crashes is increased. The crash sensing in the lower speed range become more reliable. The crash sensing in the upper speed range becomes possible in the early course of the crash, whereby here also an only minimal reduction of the body braking distance and of the body braking time is guaranteed. The meeting of the requirements with respect to quality and reliability of the triggering system according to IEC DIN (Standard) 61508 SIL2/3 is ensured in this case at any time.

In addition, by means of the structure-borne ultrasound signals, deforming and non-deforming events which emit in different frequency ranges can be better differentiated—for example, vibrations by loose particles, flow processes or shocks mainly cause emissions in the audible-sound and infrasound range ($10^{-1}$-$10^4$ Hz)-.

As a result, the risk of undesired triggerings or faulty triggerings, particularly of the air bags, is reduced in the case of events which are not dangerous to the occupants.

According to a preferred embodiment of the invention, the triggering system uses at least two different types of crash signatures for determining the occupant risk signatures and the exceeding of the risk threshold values, and carries out a plausibility check on these crash signatures.

For determining the occupant risk signatures and the exceeding of the risk threshold values, the triggering systems may use different types of signals, such as the structure-borne ultrasound signature and an acceleration signature, which are detected and preprocessed by means of the crash sensors, and may carry out a plausibility check on these signals. In the case of all conceivable crash cases, the process thereby operates with an even higher constant reliability and a still further reduced susceptibility to interferences. The taking into account of additional signatures, such as pressure changes in cavities, temperature changes, etc., is basically also conceivable for further optimizing the reliability of the method. By a higher weighting of the structure-borne ultrasound signature with an adjustable priority in comparison to the other signatures, the time-related tolerance can in this case be optimized when determining the crash detection and the triggering points in time for the occupant protection devices, particularly in the case of lateral crash events. Furthermore, a permanent system self-diagnosis of the triggering system may be provided, for example, by means of the structure-borne sound noises constantly generated by the moving vehicle and/or the structure acceleration noises. The operational reliability of the triggering system is thereby increased.

Newer protection devices can be controlled with respect to their activation characteristic and their protection characteristic, for example, by a limitation of their belt tightening intensity in the case of a belt system or by a multi-stage gas generator in the case of an air bag system. By way of the crash algorithm or the triggering system, such protection devices can be adjusted in their protective effect to the extent of the risk to the occupants and thereby improve the effectiveness of the occupant protection devices even more. In particular, a belt tightening system can be controlled by means of a variable belt tightening force adapted to a certain occupant risk and exceeding of the risk threshold value; and an air bag system can be controlled by means of a variable inflation intensity adapted to the determined seriousness of the crash. In addition, the deactivating of triggered protection devices can also be actively controlled. A tightened or locked belt reduces the freedom of movement and an active air bag additionally limits the occupant's view. These protection devices are therefore designed such that, after the necessary duration of the protective effect, the locking of the belt is automatically released and the air bag collapses while evacuating. The deactivation of the occupant protection devices can basically be further improved in that the crash algorithm actively determines the end of the necessary protection duration and then transmits corresponding information to the triggering system, so that the protection devices are deactivated as early as possible.

The known devices for activating the occupant protection devices have the disadvantage that they are relatively costintensive, have a relatively low crash selectivity and crash sensitivity and are not optimally protected from interference signals.

Another aspect of the present invention is to develop a device for activating occupant protection devices which has a higher efficiency, causes lower cost expenditures and guarantees a higher operational reliability.

Consistent with the present invention, a device for activating occupant protection systems in a motor vehicle relevant to a risk to occupants in the event of a crash is provided. The device comprises: a crash sensor system, including at least three similar multifunctional peripheral crash sensors arranged at different sites of a vehicle body, wherein, by way of the crash sensor system, physically diverse signatures generated by effects to the vehicle body are detected and preprocessed directly at crash sensor mounting sites, the signatures being relevant to a type, an intensity, a direction and a time of crash signatures and/or occupant risk signatures; and a processor-based triggering system configured to evaluate signals of the crash sensors and actuate the occupant protection systems.

By means of the crash sensor system, a faster and more reliable locating and evaluation of a crash event can be achieved than previously. The crash sensor system consists of at least three multifunctional crash sensors of the same type which are distributed at the vehicle peripherally at signature relevant and/or protection-relevant sites, preferably in an equal-sided manner on the pillars and centrally, preferably as a component of the triggering system centrally at the vehicle tunnel. Particularly the A-pillars in combination with a central installation site (vehicle tunnel) as well as the B- and C-columns can be used as advantageous mounting sites of the crash sensors. The stress signals propagating at up to 6,000 m/s over the vehicle body can be preprocessed by means of the sensor system directly at the mounting sites and can be transmitted to the central triggering system, preferably by way of a databus system. Particularly as a result of detected structure-bone ultrasound signatures, lateral crashes (lateral impact accidents), in the case of which, so far, a more delayed operating sequence took place in the triggering system, can be evaluated particularly rapidly. This leads to a faster triggering decision and thus to a lower time-related tolerance during the crash detection and activation of the protection devices.

Consistent with the present invention, a crash sensor for a device that activates occupant protection systems in a motor vehicle relevant to a risk to occupants in the event of a crash is provided. The device includes a processor-based triggering system for evaluating signals of the crash sensor and actuating the occupant protection systems. The crash sensor comprises: a housing constructed from a cylindrical hollow body and plastically coupled to a vehicle body by way of a signal-conducting carrier; a plug-type connection, leading laterally out of the housing, that can be connected with a coupling element arranged on the vehicle body; and at least one sensitive element that is assigned to the plug-type connection and that is arranged on an electronic printed circuit board inside the housing while being operatively connected with the signal-conducting carrier.

The crash sensor can be connected with the vehicle body by means of the plastic coupling. By way of one or more mounting interface(s) for the plastic coupling, particularly structure-borne ultrasound signatures arrive in the carrier and travel through it. When passing the position of the sensitive element, an intensity-proportional signal is generated therein, which is fed to an electronic system which processes the signal form and provides the processed signal to the triggering system for the evaluation. Furthermore, by way of the sensitive element and/or by means of additional sensitive elements arranged in the housing, other signatures, such as accelerations, temperature changes, pressure changes, and others, can be detected. The sensitive element may be constructed as a longitudinal wave sensor element made of piezoxide, which is connected with the carrier with respect to the acoustic impedance, and may be contacted by means of multiple pressure tongues of different resonance frequencies at the electronic printed circuit board. As a result, a particularly high structure-borne sound sensitivity is achieved and a simple and reliable contacting is guaranteed. The design of the sensitive element in the shape and cross-section as well as the number and locations of mounting interfaces can also influence the sensitivity characteristic and the frequency response of the structure-borne ultrasound sensing of the crash sensor. The carrier may be connected in one piece with the housing. A one-piece construction of the carrier and the housing has a favorable effect on the manufacturing costs and permits a particularly compact and robust design of the sensor. A watertight end of the housing arranged on the vehicle can further increase the operational reliability and service life of the sensor.

By way of its mechanical interface with the vehicle body, the crash sensor permits a faster acquisition of physically diverse crash signatures, particularly structure-born sound—additional signals include, for example, acceleration, temperature change, and pressure change—by the direct measuring at sites close to the periphery and central sites, which have priority for the protection of the individual occupants, particularly in the case of lateral crashes, at particularly high speeds or for a correct risk assessment at particularly low speeds. The crash sensitivity and the crash selectivity are thereby improved. As a result of the fact that the crash sensor can measure and process physically diverse signatures, different special sensors for the detection of different types of signals are no longer necessary. On the whole, the assembly variety in occupant protection devices on the whole can thereby be reduced, which leads to reduced costs with respect to the series price or can significantly increase the scope of the series of an occupant protection system, for example, by additional air bags in the knee region or headrest region while the costs remain the same.

Consistent with the present invention, a motor vehicle having a device for activating occupant protection systems relevant to a risk to occupants in the event of a crash is provided. The device includes a processor-based triggering system for evaluating crash sensor signals and actuating the occupant protection systems. The motor vehicle comprises: at least one crash-relevant structural element on the vehicle body, wherein the at least one crash-relevant structural element includes one or more materials having a structure-borne ultrasound sensitivity in the event of a plastic deformation, and/or wherein the at least one crash-relevant structural element is at least one of alloyed, coated, plated, reinforced, and doped by means of the one or more materials.

As a result of relatively simple constructive and/or technological measures on crash-significant structural standard elements of the motor vehicle, the quality of the signatures generated in the event of a crash and used for the crash detection can be further improved. Structure-borne sound and particularly ultrasound generated in the motor vehicle by a crash event is particularly suitable for increasing the crash detection selectivity. The generating of ultrasound in the event of a crash in structural elements of the motor vehicle to a large extent is a function of their shape and their material. It is therefore particularly advantageous to use material with a specified signal characteristic for crash-signature-relevant structural elements. Components made of cold-rolled deep-drawn steel or cold-rolled alloyed deep-drawn steel with a specified increased ultrasound signal characteristic during the deformation were found to be particularly suitable in tests. Structural elements which are prepared over the entire surface or a partial surface by means of particles and have a specified ultrasound characteristic selectively occurring during the deformation are particularly suitable. The structure-borne ultrasound sensitivity can also be further improved by a special shaping.

Additional details of the invention are found in the following detailed description and the attached drawings, in which embodiments of the invention are illustrated as examples. Other objects, advantages and novel features of the present invention will become apparent from the following detailed description of the invention when considered in conjunction with the accompanying drawings.

BRIEF DESCRIPTION OF THE DRAWINGS

The invention is explained in further detail below with reference to the attached drawings. In the drawings.

DETAILED DESCRIPTION OF THE DRAWINGS

The following description refers to the accompanying drawings. The implementations set forth in the following description do not represent all implementations consistent with the claimed invention. Instead, they are merely some examples of implementations consistent with the invention. Other implementations may be used and structural and procedural changes may be made without departing from the scope of present invention.

A device for activating occupant protection devices 3, 3', 3", 3'" in a motor vehicle may include a crash sensor system 1 having at least three peripheral crash sensors 2, 2', 2" and a triggering system.

Figure 1:
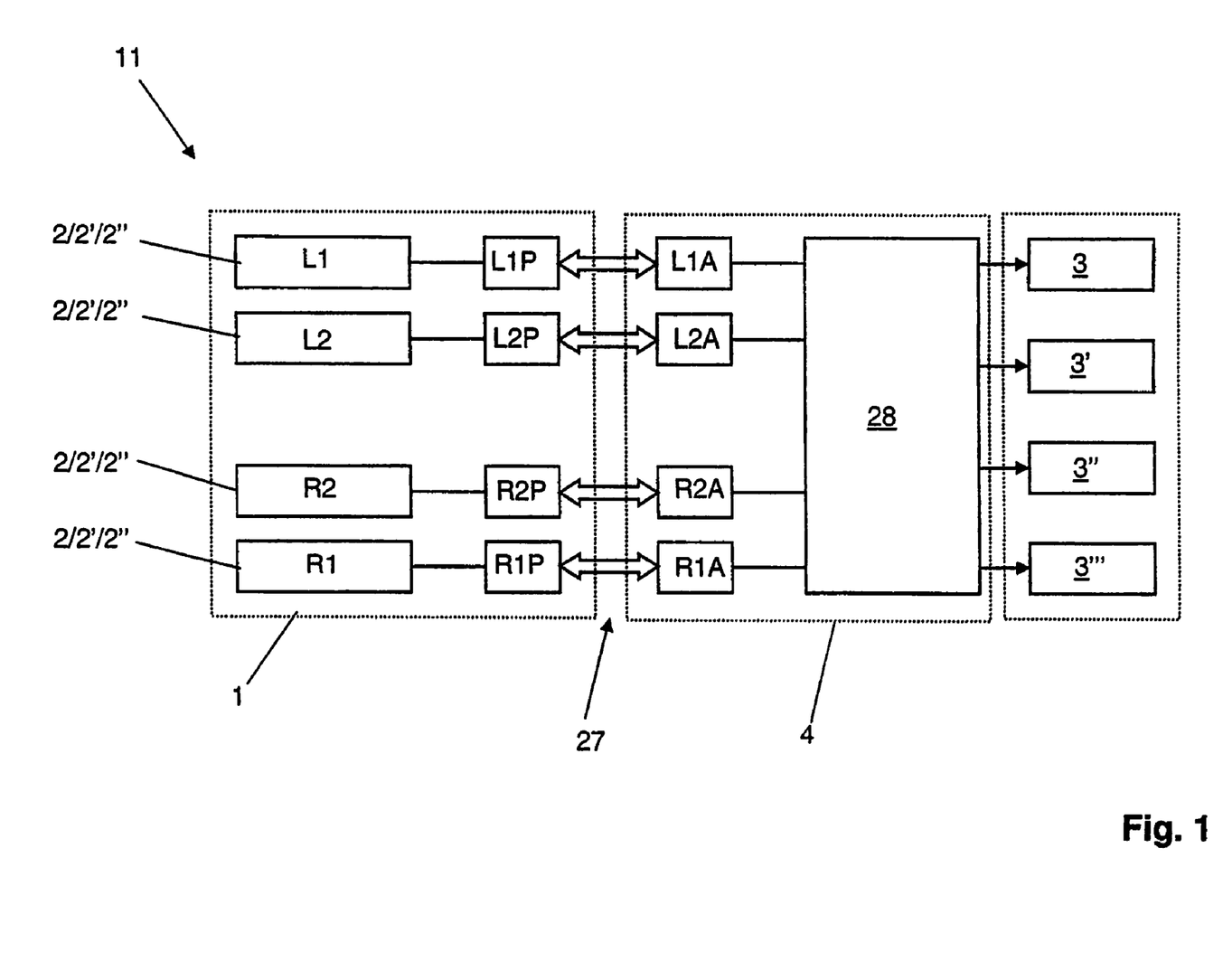
FIG. 1 is a block diagram of an occupant protection system having peripheral crash sensors.

FIG. 1 illustrates an occupant protection system 11, which is constructed with a crash sensor system 1 having four peripheral crash sensors 2, 2', 2". In this case, a first sensor 2, 2', 2" called L1 is provided at a door anchor forward left; a second sensor 2, 2', 2" called L2 is provided at a door anchor rearward left; a third sensor R1 is provided at a door anchor forward right; and a fourth sensor R2 is provided at a door anchor rearward right. The sensors L1, L2, R1, R2 are advantageously arranged on structural elements made of cold-rolled deep-drawn steel which, with respect to the material and shape, are constructed to be particularly structure-borne ultrasound-sensitive and which are arranged or constructed at the corresponding sites of the vehicle body 21.

The crash sensor system 1 is connected by way of a safety databus system (Si databus) 27 with the triggering system 4. In the data bus system 28, on the sensor side, one serial interface L1P, L2P, R1P, R2P respectively is assigned to the individual sensors and, at the triggering-system side, one serial interface L1A, L2A, R1A, R2A respectively is assigned to the individual sensors. By way of an electronic triggering device 28 of the triggering system 4, the different occupant protection devices 3, 3', 3", 3'" can be controlled which are provided in the occupant protection system 11.

Figure 2A:
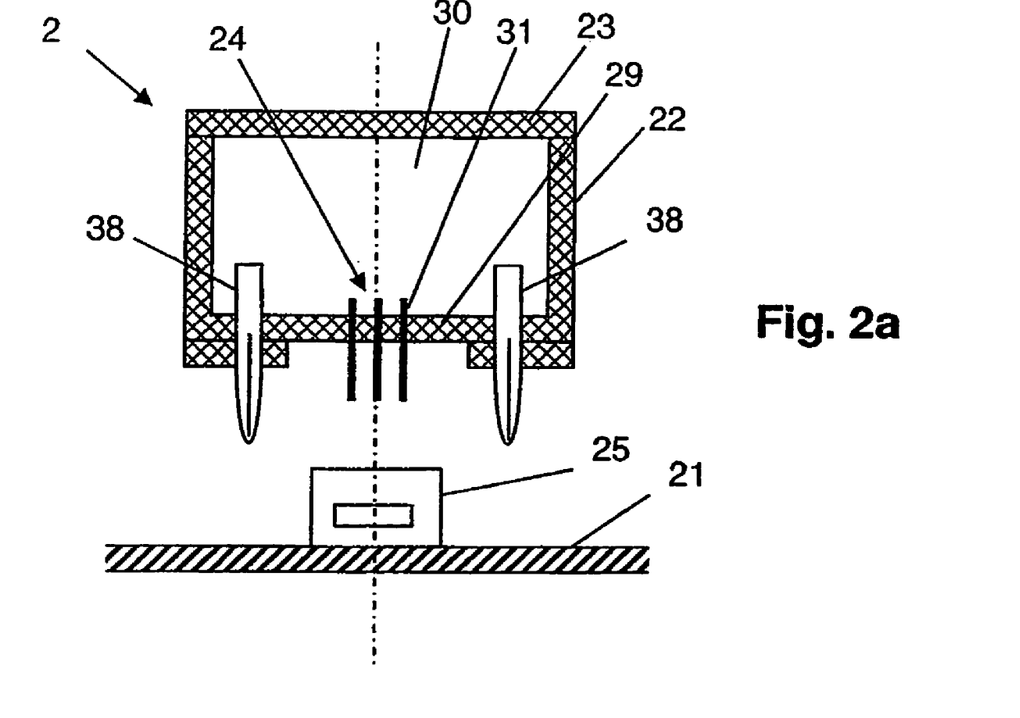
FIG. 2a is a schematic lateral sectional view of a first embodiment of a peripheral crash sensor illustrated in a simplified manner before the mounting on the vehicle body in an open state.
Figure 2B:
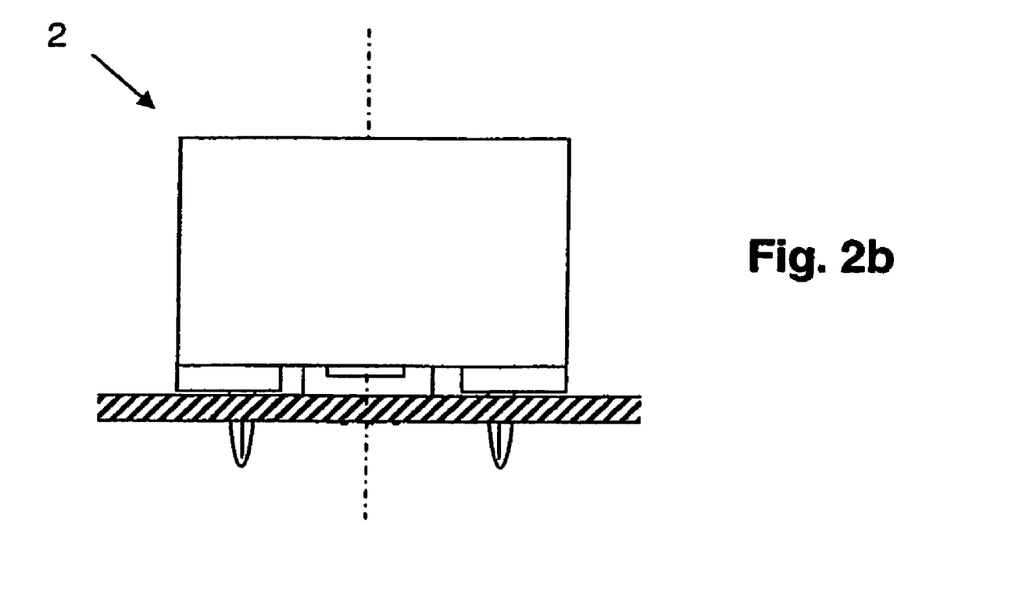
FIG. 2b is a schematic lateral sectional view of a first embodiment of a peripheral crash sensor illustrated in a simplified manner after the mounting on the vehicle body in a closed state.

A crash sensor 2, 2', 2" essentially includes or consists of a housing 22 in which a sensitive element 36 is arranged which is operatively connected by way of the housing 22 with a vehicle body 21.

In a simplified illustration of the sensor 2 in FIG. 2a, the housing 22 is constructed as a cylindrical hollow body having an interior 30 with free cavities, with a base plate 39 as part of the housing 22, into which three steel sleeves 38 are inserted on a circle at an angular spacing of 120°. On the sensor side, the steel sleeves 38 project into the cavity 30 of the hollow body 22 and, on the vehicle body side, reach through the base plate 29. On the side of the cavity 30, they are tightly closed off. On the side facing away from the cavity 30, the steel sleeves 38 are spring-mounted by means of longitudinal slots. The housing 22 is advantageously constructed of a plastic body produced by injection molding and can be tightly closed off by means of a lid 23 by way of a laser welded connection 26. In the mounted condition (FIG. 2b), the spring-mounted steel sleeves 38 reach into corresponding bores of the vehicle body 21 and, together with the latter, form a mechanical connection. Furthermore, a plug-type connection 24 is arranged on the base plate 29, whose electric contacts advantageously constructed as press-in pins 31 project through the base plate 29. In the mounted condition, the plug-type connection 24 is connected with a coupling element 25 arranged at a signature-relevant or occupant-protection-relevant peripheral section of the vehicle body 21.

Figure 6A:
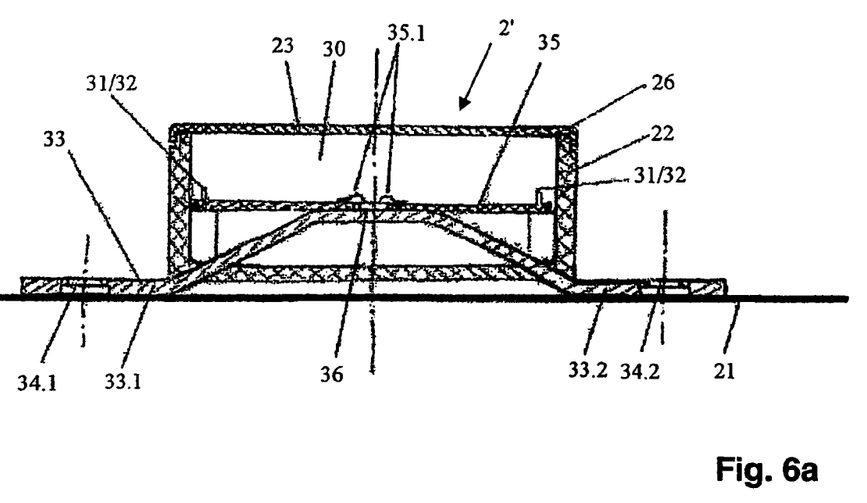
FIG. 6a shows a sectional lateral view of a second embodiment of the peripheral crash sensor with details concerning the structure-borne ultrasound detection.
Figure 6B:
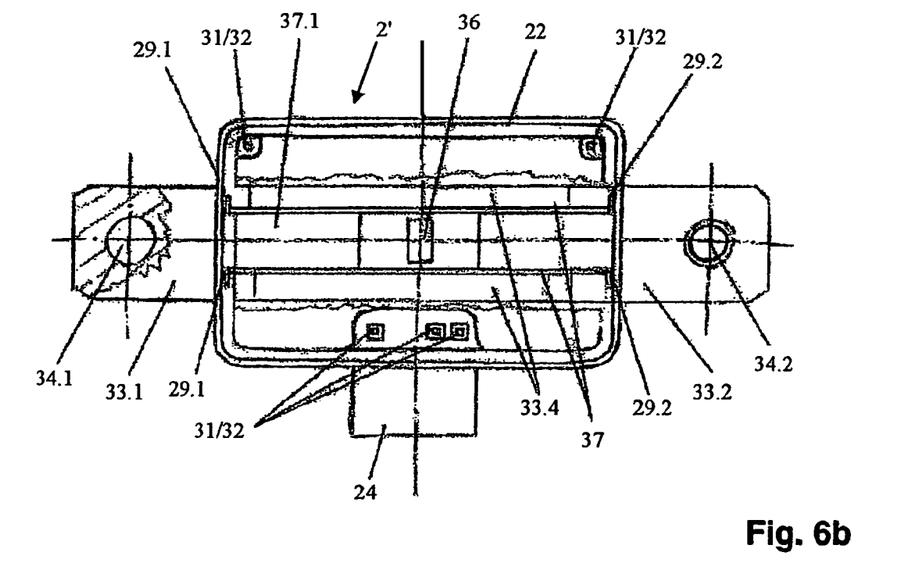
FIG. 6b shows a sectional top view of a second embodiment of the peripheral crash sensor with details concerning the structure-borne ultrasound detection.
Figure 7A:
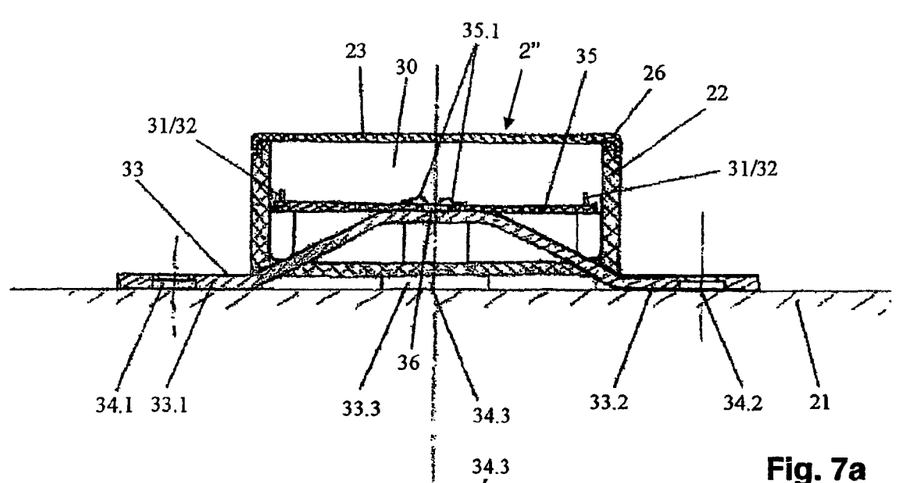
FIG. 7a shows a sectional lateral view of a third embodiment of the peripheral crash sensor with details concerning the structure-borne ultrasound detection.
Figure 7B:
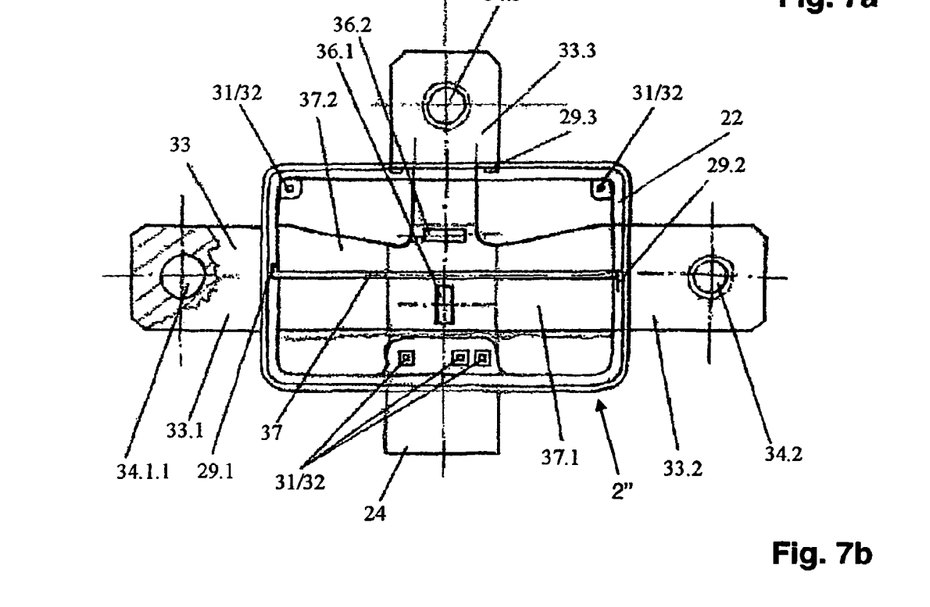
FIG. 7b shows a sectional top view of a third embodiment of the peripheral crash sensor with details concerning the structure-borne ultrasound detection.

FIGS. 6 and 7 show constructive embodiments of the multifunctional crash sensor as examples, the part used for the detection of the structure-borne ultrasound signature according to the invention being shown in detail.

In a second embodiment 2' of the crash sensor (FIGS. 6a and 6b), the housing 22 is plastically coupled to the vehicle body 21 by way of a signal-conducting carrier 33. Two attachments 33.1, 33.2 with bores as mounting interfaces 34.1, 34.2 are constructed on the carrier 33, by way of which mounting interfaces 34.1, 34.2, the carrier 33 can be plastically coupled to the vehicle body 21. The interfaces 34.1, 34.2 may, for example, be constructed as screwed connections, pinned connections or riveted connections. By way of two anchors 29.1, 29.2, the housing 22 is held on the carrier 33. On the carrier 33, an electronic printed circuit board 35 is arranged on two stability webs 33.4 and is fastened by means of a press-in connection 32 with press-in pins 31 and is electrically contacted by means of the plug-type connection 24. The plug-type connection 24 leads laterally out of the housing 22. The sensitive element 36, for example, a longitudinal-wave sensor element made of piezoxide, is integrated in the electronic printed circuit board 35, for example, an SMD assembly on a multi-layer through-plated print circuit, and, with respect to the acoustic impedance, is connected with the carrier 33. The sensor element 36 is advantageously applied by means of a vapor deposition process and is contacted by means of push-contact springs 35.1 with multiple pressure tongues of different resonance frequencies with the printed circuit board 35. The prestressing of the multiple pressure tongues and the fastening of the printed circuit board advantageously takes place by bending protruding ends of the press-in pins 31 into an inclined position. The press-in pins 31, in turn, cannot be pulled out and are tightly connected with the housing 22. Two slots 37 are provided for the uncoupling of the sound path 37.1 between the attachments 33.1, 33.2.

In a third embodiment 2" of the crash sensor, the carrier 33 is constructed with three attachments 33.1, 33.2, 33.3 and the corresponding mounting interfaces 34.1, 34.2, 34.3 in a triangular shape and is held on the housing 22 by means of three anchors 29.1, 29.2, 29.3 (FIGS. 7a and 7b). The uncoupling of sound between the sound path 37.2, that is, between the attachments 33.1/33.2 or 33.3 is here implemented by only one slot 37. On both sides of the slot 37, two sensor elements 36.1, 36.2 are arranged which are orthogonally aligned with respect to their longitudinal axis. While sensor 2' has a cos φ-sensitivity characteristic, in the case of sensor 2", two cos φ-sensitivity characteristics are obtained that are offset by 90°.

Stress signals of the vehicle body 21 are transmitted to the sensor element 36 by the mechanical connection of the sensor 2, 2', 2" with the vehicle body 21 and are converted to electric voltages by this sensor element 36. The voltages are pretreated in the electronic system 35, are tapped by the plug-type connection 34 and are provided by way the databus for the further processing over the triggering system 4.

Figure 3:
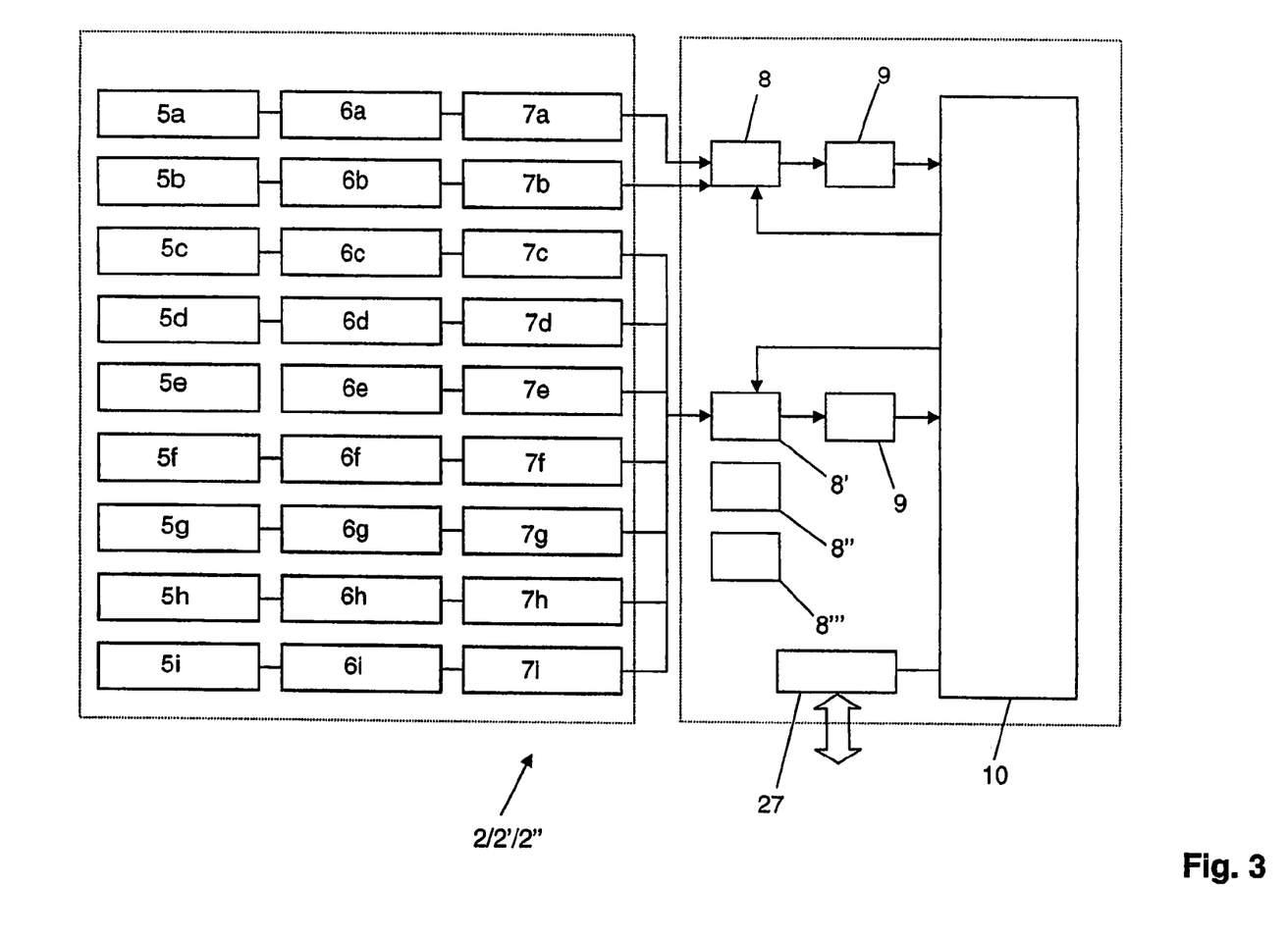
FIG. 3 is a functional block diagram of a peripheral crash sensor.

The sensor 2, 2', 2" permits (together with the corresponding sensitive element(s)) the measuring of different physical effects upon the vehicle. This is outlined in a functional block diagram in FIG. 3. The individual functional blocks are a structure-borne ultrasound sensor 5a, a structure-borne sound sensor 5b, an acceleration sensor 5c, a vibration sensor 5d, a structural mass sensor 5e, a strain and torsion sensor 5f, a magnetic-field change sensor 5g, a temperature change sensor 5h and a gyro sensor 5i. A pre-amplifier 6a-i and a frequency filter 7a-e are connected to the output side of each sensor 5a-i. The structure-borne sound and the structure-borne ultrasound are read out in a mode scanner 8 and are transmitted to a microprocessor system 10 by way of an analog-to-digital converter 9. The remaining signatures are scanned by way of additional scanners 8' of the individual signal types and are read into the microprocessor system 10 by way of a second analog-to-digital converter 9. Finally, a scanner 8" for the filter adjustments of the frequency filters 7a-i as well as a scanner 8''' for the pre-amplifier adjustments of the pre-amplifiers 6a-i is also provided.

Figure 5:
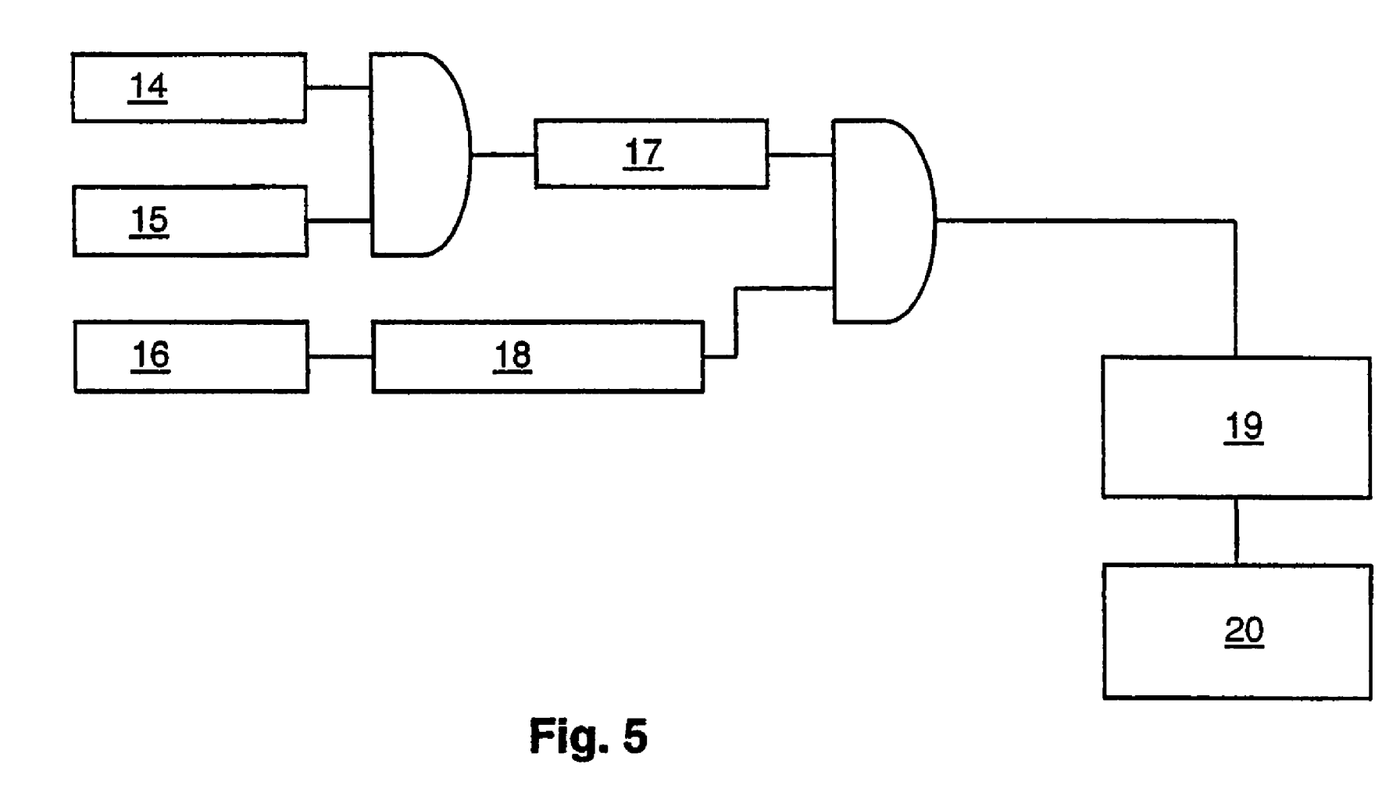
FIG. 5 is a block diagram for the development of structure-borne ultrasound emissions.

The different parameters, which contribute to the development of structure-borne ultrasound, thus high-frequency vibrations on the vehicle body 21, are illustrated in FIG. 5. The material properties 14 and the environmental conditions 15 generate a certain material behavior 17. An overstressing 16 at the vehicle body with a subsequent exceeding of the mechanical withstand strength 18 will then result in a plastic deformation 19 which generates a source of sound and continues in a burst-type wave propagation 20. The material behavior can be utilized in a targeted manner for the sensing of structure-borne ultrasound signatures. For this purpose, crash-relevant structural elements are partially or completely manufactured from a material with increased structure-borne ultrasound sensitivity, advantageously cold-rolled deep-drawn steel, or are prepared with such particles.

A method of activating occupant protection devices 3, 3', 3", 3''' in a motor vehicle is based essentially on the evaluation of structure-borne ultrasound signatures and, as required, additional signal signatures. The method according to the invention is advantageously carried out by means of the protection system 11 described in FIG. 1, having the crash sensor system 1 according to the invention, or by means of the crash sensor 2, 2', 2" according to the invention.

In a first process step, the signatures generated by effects upon the vehicle body 21 are detected and preprocessed by means of the crash sensor system 1, including the multifunctional crash sensors L1, L2, R1, R2, directly at the mounting sites and are provided to the triggering system 4.

Figure 4:
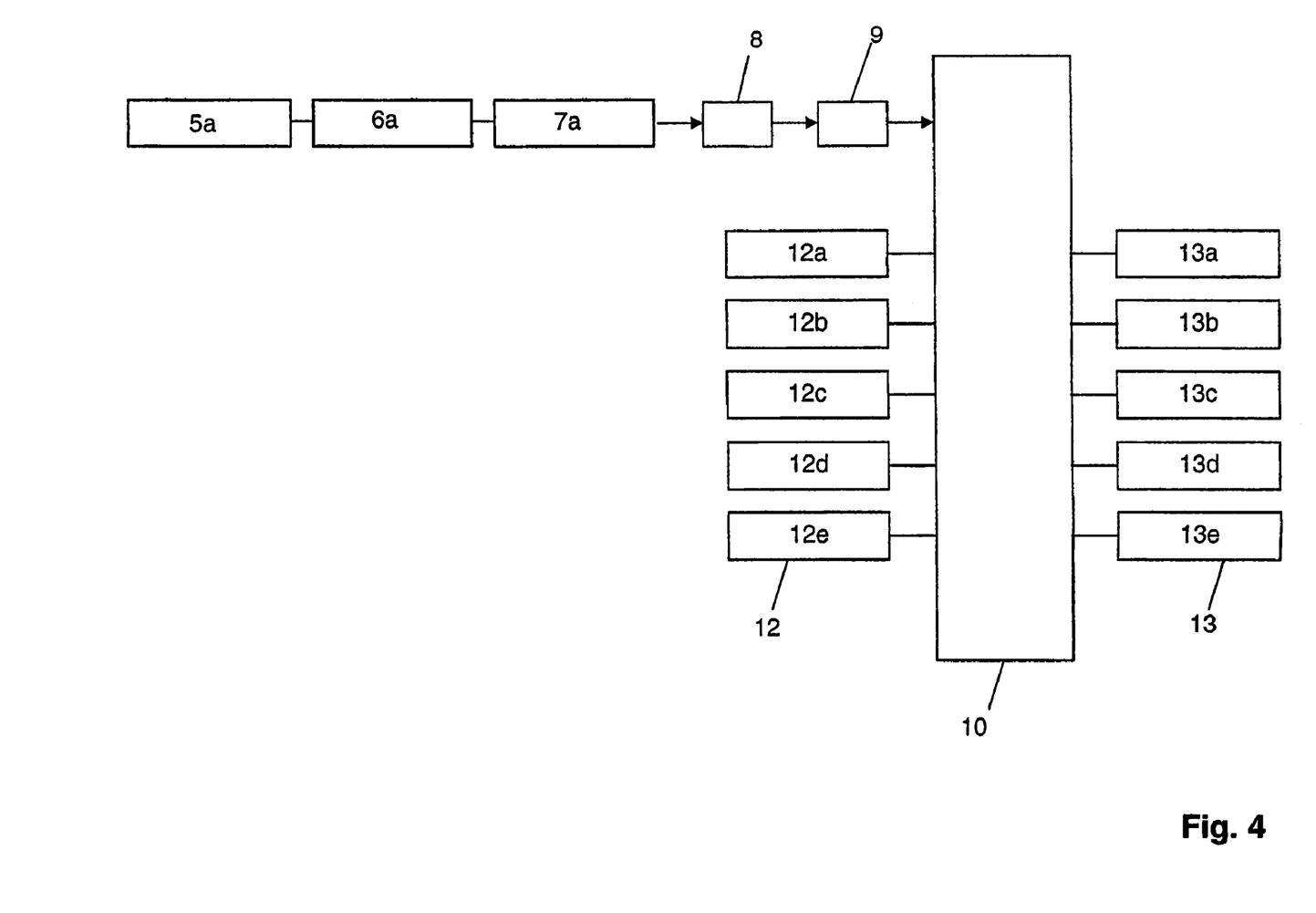
FIG. 4 is a functional block diagram for sensing structure-borne ultrasound emissions in the peripheral crash sensors.

In a second step, the read-in digitized signatures are evaluated in the microprocessor system 10 according to the type, the intensity, the direction and the time of crash signatures and/or occupant risk signatures by means of a crash algorithm. In this case, plausibility checks can be carried out by means of several signatures. The data processing is demonstrated, for example, for the sensing of the structure-borne ultrasound emissions in FIG. 4. The crash algorithm uses different software programs 12a-e for the system operation of the crash sensor system 1, for the detection of structure-born ultrasound signals, for the detection of artifacts (such as interference signals), for the detection of the signal cause and for the crash detection. Different memories 13a-e, in which characteristics of structure-borne ultrasound emissions, artifacts and the structure of the vehicle body 21 are filed, are assigned to the microprocessor system 10. The memory 13e particularly contains parameter fields for the triggering-time-dependent occupant protection performance capability of different protection stages of the occupant protection devices (3, 3', 3", 3'''). The memory 13d is provided as a general data memory. The crash algorithm applies the software programs 12a-e to the incoming signals and evaluates them according to the type and seriousness of the effect by means of the characteristic data filed in the memories 13a-c. Here, the structure-borne ultrasound signatures have priority. The source of the sound is located by way of the transit time differences (measuring by means of time-synchronous markers) of the signal detection at the individual peripheral crash sensors 2, 2', 2". When a crash event is detected, a differentiation is made according to the seriousness and the type of the crash.

In a third step, an exceeding of an occupant risk threshold value is checked or determined and, as required, a triggering decision is made as well as in each case a triggering point in time is defined for all the occupant protection devices 3, 3', 3", 3''' or individual occupant protection devices, which triggering point in time guarantees the maximally achievable protective effect of the occupant protection devices (3, 3', 3", 3''') for the occupants. Correspondingly, the relevant protective stages of the relevant occupant protection devices (3, 3', 3", 3''') are then triggered at the most suitable point in time by way of the electronic triggering system 28.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of activating occupant protection systems in a motor vehicle relevant to a risk to occupants in the event of a crash, the method comprising the acts of:
    detecting and preprocessing, directly at crash sensor mounting sites, signatures generated by effects on the vehicle body by means of a crash sensor system, the crash sensor system including a plurality of similar multifunctional peripheral crash sensors arranged at different sites of the vehicle body;
    evaluating the preprocessed signatures or variables derived therefrom by means of a crash algorithm assigned to a processor-based triggering system according to a type, an intensity, a direction and a time of crash, signatures and/or occupant risk signatures, and
    triggering crash-relevant occupant protection devices at respective triggering points in time defined according to the achievable occupant protection effect of the occupant protection devices when occupant risk threshold values are exceeded.

2. The method according to claim 1, wherein the triggering points in time are determined using stored parameter fields of a protection performance capability of the occupant protection devices, which is a function of the triggering points in time.

3. The method according to claim 2, wherein the triggering system takes into account protective stages of the occupant protection devices assigned to the parameter fields.

4. The method according to claim 1, further comprising:
    determining that occupant risk threshold values are exceeded using the occupant risk signatures.

5. The method according to claim 1, further comprising:
    determining the occupant risk signatures and that occupant risk threshold values are exceeded using at least two different types of crash signatures; and
    performing at least one plausibility check on the at least two crash signatures.

6. The method according to claim 1, wherein a first of the detected crash signatures includes a structure-borne ultrasound signature.

7. The method according to claim 6, wherein a second of the detected crash signatures includes an acceleration signature.

8. The method according to claim 6, wherein the respective triggering points in time are determined involves weighting the structure-borne ultrasound signature in the event of lateral crash events with a high priority.

9. The method according to claim 1, further comprising:
    controlling, by the triggering system, an occupant protection device that is constructed as a belt system with a variable belt tightening force by means of a belt tightening force adapted to a certain occupant risk and an exceeding of a risk threshold value.

10. The method according to claim 1, further comprising:
    controlling, by the triggering system, an occupant protection device constructed as an air bag system by means of a variable inflation intensity adapted to a determined seriousness of a crash.

11. The method according to claim 1, further comprising:
    performing, by the triggering system, a system self-diagnosis including the crash sensor system.

12. The method according to claim 11, wherein a stimulation of the crash sensors during the system self-diagnosis occurs by a structure-borne sound noise and/or a structure-borne acceleration noise of the motor vehicle.

13. A device for activating occupant protection systems in a motor vehicle relevant to a risk to occupants in the event of a crash, the device comprising:
    a crash sensor system, including at least three similar multifunctional peripheral crash sensors arranged at different sites of a vehicle body,
    wherein, by way of the crash sensor system, physically diverse signatures generated by effects to the vehicle body are detected and preprocessed directly at crash sensor mounting sites, the signatures being relevant to a type, an intensity, a direction and a time of crash signatures and/or occupant risk signatures; and
    a processor-based triggering system configured to evaluate signals of the crash sensors using a crash algorithm according to the type, intensity, direction, time of crash signatures and occupant risk signatures, and actuate the occupant protection systems at respective triggering points in time.

14. The device according to claim 13, wherein the crash sensor system includes at least three crash sensors that are peripherally distributed in an equal-sided manner and are arranged centrally on the vehicle body.

15. The device according to claim 14, wherein a centrally arranged crash sensor is a component of the triggering system.

16. The device according to claims 13, wherein the crash sensors are arranged on at least one of signature-relevant sites of the vehicle body and protection relevant sites of the vehicle body.

17. The device according to claim 13, wherein the triggering system is electrically connected by way of a databus system with the crash sensors of the crash sensor system.

* * * * *